United States Patent [19]
Chabbert

[11] Patent Number: 5,409,302
[45] Date of Patent: Apr. 25, 1995

[54] BRAKING METHOD AND DEVICE, VEHICLE EQUIPPED WITH SAID DEVICE

[75] Inventor: Philippe Chabbert, Rueil Malmaison, France

[73] Assignee: Thomson-CSF, Puteaux, France

[21] Appl. No.: 132,039

[22] Filed: Oct. 5, 1993

[30] Foreign Application Priority Data

Oct. 6, 1992 [FR] France .................. 92 11817

[51] Int. Cl.$^6$ .............................................. B60T 8/58
[52] U.S. Cl. ........................... 303/112; 303/102; 188/181 T
[58] Field of Search .............. 188/181 T; 303/112, 303/102, 103, 107, 100

[56] References Cited

U.S. PATENT DOCUMENTS

| | | | |
|---|---|---|---|
| 3,508,795 | 4/1970 | Scharlack et al. | 303/21 |
| 4,043,607 | 8/1977 | Signorelli et al. | 303/112 X |
| 4,811,993 | 3/1989 | Matsumoto et al. | 303/112 X |
| 4,842,342 | 6/1989 | Takahashi et al. | 303/102 |
| 5,001,640 | 3/1991 | Matsumoto et al. | 303/102 X |

FOREIGN PATENT DOCUMENTS

| | | |
|---|---|---|
| 0264855 | 4/1988 | European Pat. Off. . |
| 0297485 | 1/1989 | European Pat. Off. . |
| 2660270 | 10/1991 | France . |
| 3729963 | 3/1988 | Germany . |
| 4017889 | 10/1991 | Germany . |
| 8502590 | 6/1985 | WIPO . |

*Primary Examiner*—Robert J. Oberleitner
*Assistant Examiner*—Peter M. Poon
*Attorney, Agent, or Firm*—Meltzer, Lippe, Goldstein, et al.

[57] ABSTRACT

A method and device, using fuzzy logic, to control the value of a braking torque of a wheel of a vehicle applied to a track, the input variables being the coefficient of slippage of the wheel on the track, the first derivative of this coefficient with respect to time, the derivative of the braking torque with respect to the slippage and the value of the braking torque, the output variable being an algebraic increase of the braking torque. Application to wheeled vehicles.

16 Claims, 8 Drawing Sheets

| SLIPPAGE \ SLOPE | 21 | 22 | 23 | 24 |
|---|---|---|---|---|
| 33 | 1 | 2  0,8  0,5 | 3  0,8  0,3 | 4 |
| 32 | 5 | 5  0,2  0,5 | 5  0,2  0,3 | 5 |
| 31 | 6 | 6 | 6 | 6 |

BRAKING METHOD AND DEVICE, VEHICLE EQUIPPED WITH SAID DEVICE

BACKGROUND OF THE INVENTION

1. Field of the Invention

The present invention relates to a method and device for the braking of wheels in contact with a track, especially but not exclusively wheels of vehicles, through the servo-control of the braking torque applied to each of the wheels of the vehicle. It relates more particularly to the methods and devices in which it is sought to position the value of the braking torque to the maximum possible, taking account of the adherence of the wheel to the track.

2. Description of the Prior Art

The patent application No. FR 91.13119 dated 23rd Oct. 1991 describes a method and device designed for such a use. It is known, according to this application, that the maximum torque that can be exerted by a track on a wheel undergoing a braking force has a value that depends on the slippage of the wheel on the track. For a wheel such as the one shown schematically in FIG. 1a, the value of this torque as a function of the slippage has the aspect of the curve 8 shown in FIG. 1b.

FIG. 1a gives a schematic view of the profile of a wheel 9 that is rotationally attached by a shaft 10, located at the center 0 of the wheel, to a vehicle (not shown). The wheel rotates with a speed $\omega$, expressed in radians per second, in the direction indicated by the arrow 11. The forces of adherence of the wheel to a track 12, depicted schematically by a line, create a force at the point A of contact between the wheel 9 and the track 12. When a braking torque is applied to the wheel, as the torque tends to reduce the speed, the forces of adherence F create a counter torque for the wheel. The curve 8 of FIG. 1b shows the appearance of the maximum value of the torque, created on the wheel by the forces of adherence between the wheel 9 and the track 12, that can be countered. This maximum value is a function of the value of the slippage of the wheel.

This torque has the value $F \times R$, R designating the radius of the wheel.

The curve 8 of FIG. 1b shows that this torque touches a maximum value M for a slippage value $g_0$. This slippage value characterizes the maximum of the value of the braking torque that can be applied efficiently to the wheel. The corresponding point of the curve 8 having coordinates $g_0 M$ is referenced C.

The patent application No. 91.13119, already mentioned, describes a method and a device aimed at carrying out the braking in such a way that the slippage remains around the value g enabling the efficient application of a maximum braking torque.

The present invention is aimed at obtaining an efficient, low-cost control and regulation device enabling the application, to each of the wheels, as a function of a braking control value, of the optimum braking torque M defined by the curve 8 whenever this is necessary. The phrase "whenever this is necessary" refers to whenever the control value, which shall hereinafter be called "pedal pressure" leads to a torque greater than the optimum torque that can be obtained in view of the slippage of the wheel at this time, this being the case whatever the value of adherence.

For a clear understanding of the invention, we shall return here below to the meaning given to slippage and to the way in which the coefficient of slippage g is applied, as well as to the way in which the operating point shifts when it is not on the curve 8.

Slippage is generally defined by a coefficient of slippage g, expressing the percentage represented by the speed of slippage in the total speed of the vehicle.

$$g = \frac{V_V - V_R}{V_V} \times 100\% = \left(1 - \frac{V_R}{V_V}\right) \times 100\% \quad (1)$$

In the formula (1) above, $V_V$ is the speed of the vehicle, $V_r$ is the speed resulting from the rotation speed $\omega$ of the wheel ($V_r = \omega R$).

If we consider a straight line $\Delta$ with a y-axis value $C_1$ below the maximum M defined on the curve 8 by the point C having the x-axis value $g_0$, this straight line crosses three zones. The first zone 15 is above the curve 8 and to the left of a straight line 13 having an x-axis value $g_0$ shown in dashes. A second zone 16 is between the curve 8 and the x-axis and finally a third zone 17 is above the curve 8 to the right of the straight line 13 having an x-axis value $g_0$.

When the slippage has a value $g_1$, for example at the point having coordinates $g_1 C_1$, it means that the braking torque is greater than the maximum torque $C'_1$ that the forces of adherence can put up against this slippage value. The rotation speed $\Delta$ of the wheel corresponding to a running speed $V_R$ will decrease faster than the speed $V_V$ of the vehicle, and the slippage will therefore be increased until it reaches the value of slippage $g'_1$ corresponding to the x-axis value of the point B where the straight line $\Delta$ intersects the curve 8 for the first time. This point is a point of equilibrium where the torque produced by the forces of adherence is equal to the torque exerted by the braking forces. The point of operation will therefore get stabilized at the point B.

If the torque $C_1$ is exerted while the slippage has the value $g''_1$ corresponding to a point of the straight line located in the zone 16, it means that the torque $C_1$ is lower than the torque $C''_1$ that may be put up as an opposing torque by the forces of adherence for this value of slippage. The speed $\Delta$ of the wheel corresponding to the running speed $V_R$ will therefore get reduced less quickly than the speed $V_V$ of the vehicle. The slippage will get reduced until it returns to the point B.

It is noted that if the slippage coefficient diminishes, it means that the point of operation is within the zone 16 where it is definitely possible to increase the efficiency of the braking by increasing the braking torque.

If the braking torque $C_1$ is exerted while the value of the slippage has the value $g'''_1$ so that the point having coordinates $C_1, g''4'0_1$ is in a zone where the braking torque is greater than the torque that can be exerted by the adherence forces, the rotational speed $\omega$ of the wheel corresponding to the running speed $V_R$ of the vehicle will get diminished more quickly than the speed of the vehicle, and the slippage will increase. In this case, if it is desired to reach a point of equilibrium from which it is possible again to increase the braking torque to a value close to its maximum value is reached, it is necessary to reduce the braking torque to a value where operation is within the zone 16, the zone within which it is possible, by gradually increasing the braking torque, to reach the point of operation defined by the point C where the braking efficiency is the maximum.

It is observed that the zone 17 includes the entire zone located above a line 14 constituted, firstly, by the straight line segment joining the point of the y-axis having the y-axis value M and the point C having the coordinates ($g_0$.M) and, secondly, the part of the curve 8 located to the right of the point C.

The curve 8 still has substantially the aspect shown in FIG. 1$b$, but the values of M, $g_0$ and even the precise shape of the curve depend on the nature of the track, especially its paving, the nature of the wheel tire and many other parameters such as, for example, the inflation pressure of the tires, the load of the wheel under the weather conditions etc.

This is why, according to the invention, in order in to obtain the maximum braking efficiency and work the neighborhood of the point C of the curve, there is provision for servo-linking the braking torque to variables that depend directly or indirectly on the slippage value of the wheel.

Such variables are first of all the slippage itself, and values representing, with respect to the slippage, derivatives with respect to other magnitudes such as time or the derivative of the braking torque with respect to the slippage. The derivatives may be first order, second order or higher order derivatives.

It has been seen further above that the zones 15, 16, 17 still exist but that they are variable as a function of the position of the curve 8 in the plane and of its real form which is known only approximately. For this reason, it has been chosen to process the variables depending on the slippage by fuzzy logic. In this way, it is possible to take account of the range of values to which the real value of a variable belongs rather than the value of the variable itself.

If the input variables, their different ranges and the rules fixing the output magnitudes as a function of the ranges to which the real value of the input variables belong are well chosen, the fuzzy logic systems make it possible to obtain very high efficiency at lower cost than with a computer working in P.I.D. (Proportional Integral Derivative) mode.

The standard mode of regulation with a P.I.D. necessitates the application of linear digital equations. These equations must simulate the behavior of the system that they regulate as efficiently as possible. The limits of the P.I.D. are reached when these mathematical equations have to simulate human or subjective ideas or when the physical system becomes too complex to be modelized with precision (because of non-linearities, degradation of the physical characteristics, etc.), or when this simulation can be achieved but requires an equation for each situation. It is at this level that fuzzy logic becomes useful.

Indeed, it enables the definition of rules of inference that increasingly approach human forms of experience and reasoning.

The explanations given here above on the value of the maximum effective torque that can be applied will be capable of being used, by means of a fuzzy logic computer, to define input and output magnitudes of such a computer as well as for the qualitative definition of the actions to be taken on the output values for each of the combinations of the input magnitudes. It will then be necessary to define a rule of "defuzzification" making it possible to pass from the recommended qualitative actions to quantified actions.

It is these quantified actions that will determine the real value of the output magnitudes within the recommended ranges.

According to the invention, the input magnitudes are:

the value of the coefficient of slippage g of the wheel on the track, this value being defined by the foregoing formula (1);

the value of the derivative of the braking torque with respect to the slippage, namely $$\frac{\Delta c}{\Delta g},$$

$\Delta g$ and $\Delta c$ designating the algebraic increases of the slippage and of the braking torque during one and same small period of time. It will be seen that, in one embodiment, this period is 5 ms. This value is given in order to provide a better definition of the qualifier "small". This value can obviously be smaller or greater. It is not obligatory that this value should remain constant. In particular, it is not ruled out that the measurement of $\Delta g$ and $\Delta c$ should be done periodically at times when these values have greater significance than at other times, for example at times when the weight exerted by the vehicle On the wheel is sufficient.

the value of the derivative of the slippage in relation to time, namely $$\frac{\Delta g}{\Delta t};$$

$\Delta g$ designates the algebraic increase of the slippage in the course of time $\Delta t$, $\Delta t$ representing the time that has elapsed since the preceding measurement of g.

Hereinafter in the explanation, the variable $$\frac{\Delta c}{\Delta g}$$

shall be called the slope, or the slippage slope, the torque being expressed in newton-meters. The slope will be expressed by a number obtained by division of $\Delta g$ by $\Delta c$ and multiplication by 10,000. The derivative of the slippage in relation to time shall be called dslip. It will be expressed by a number representing the increase of g during periods equal to 5 milliseconds.

The output value of the computer is the correction value to be applied to the braking torque exerted by the braking means of the vehicle on the wheel.

The input and output magnitudes being chosen, it will be necessary, in accordance with the known principles of fuzzy logic, to define, for each input magnitude, firstly different qualitative ranges, the passing from one range to another corresponding to a change in qualitative action on an output magnitude and, secondly, for each of the ranges, the degree of membership, in this range, of each particular value of the range. According to one embodiment of the present invention, the slope has been divided into four ranges, two ranges with a low slope, one range with a steep negative slope and one range with a positive steep slope. The two ranges with a low declivity are those that are in the neighborhood of the point C of the curve 8. It will be sought to work in these two ranges of slopes and, for this purpose, to exert an action on the braking torque tending to bring the value of the slippage coefficient around the value $g_0$.

The slippage input magnitude has been divided into three ranges, one range for the low slippages called low-slip, one range for the medium slippages called medium-slip and one range for the high slippages called high-slip. The input magnitude dslip has been divided into two ranges low Dslip and high Dslip.

The output variable is a value of pressure variation control in a device that applies friction elements to a part linked to the wheel, for example a brake shoe on a disk. This magnitude is directly related to the variation of the braking torque by a known mathematical relationship. Hereinafter, it will be likened to the variation of the braking torque.

The pressure variable has been divided into seven zones numbered 7 to 1. The pressure variation is a pressure that is algebraically added to the already existing pressure. The modifications of the pressure are applied with the same frequency as the frequency of measurement of the input variables.

The pressure zones 7 to 4 have negative values for the system works by the withdrawal or lowering of pressure to an initial pressure that is generally too high, i.e. a pressure that corresponds to a braking torque located above the maximum M of the curve 8. The zones numbered 3 and 2 are zones that include the value 0 and are, on the whole, close to 0 with values that are negative by a majority for the zone 3 and positive by a majority for the zone 2.

The logic of the computer is designed so that the correction of the braking torque remains within the spans of values included between these two zones.

This means that the zones 1 and 4 to 7 are used, in principle, in a transient phase at the start of the braking so as to take the point of operation of the brakes or, as the case may be, speedily bring this point of operation, in the plane defined by the slippage and breaking torque, to the neighborhood of the point C.

The zones 2 and 3 are then used to keep the point of operation in this neighborhood.

The zone 1 corresponds to low positive values for the braking is, as explained further above, essentially controlled by withdrawal to a pressure that initially is excessively high. This initial pressure is controlled by the pedal pressure value. In the method according to the invention, the output value of the modified pressure torque is compared with the controlled value, in such a way that the controlled value is applied when this value is smaller than the computed value. The above explanations are given to provide an understanding of how the computed variations of positive pressure, represented by the zone 1 of the output value, may keep a low value without harming the efficient operation of the braking.

The input magnitudes chosen above, the number of qualitative ranges for each of the input magnitudes and the number of qualitative zones for the output value are given by way of an example to make it easier to understand the invention. Other choices are possible without departing from the field of the invention.

For each of the ranges of the different input magnitudes and each of the zones of the different output magnitudes, there is defined a coefficient of membership, in this range or zone, of each value of the range or zone.

In a plane referenced by two axes of coordinates, where the x-axis carries the values of the magnitude and the y-axis carries the values of the membership coefficients, the ranges or zones and their membership coefficients are represented, firstly, by a segment on the x-axis and, secondly, by an arc of a curve whose y-axis value ranges from 0 to 1. The ends of the segment define the x-axis values of the limits of each range. The x-axis values of the ends of the segment are also the x-axis values of the ends of the arc of a curve representing the coefficient of membership, in a range, of a value of the range.

A definition shall now be given of the rules by which it is possible to pass from one set of qualitative input ranges, these ranges being defined by the membership of a real input value in the range, to a zone of output values.

In the exemplary embodiment of the present invention, there are three input variables and only one output magnitude.

It is therefore possible to define a 3D space by a system of axes of coordinates where each axis corresponds to an input magnitude and carries the different qualitative ranges of the input magnitudes defined here above. Although the qualitative ranges of a magnitude as defined further above may have mutually overlapping zones, it is specified to all ends and purposes that the qualitative ranges defined on each axis of the 3D space are ranges that correspond solely to a qualitative value of each input variable. They therefore do not overlap. It is also specified that this representation is not obligatory. It is aimed solely at making it easier to understand the rules that will be applied.

Two ranges have been defined on the magnitude dslip. The axis dgliss will carry two segments, each representing one of the ranges. Similarly, the slippage axis will have three segments and the slope axis will have four segments. These different segments enable the defining of $4 \times 3 \times 2 = 24$ cubes of the 3D space created. Each cube thus corresponds to a single combination of qualitative ranges of the three input variables and the set of 24 cubes represents all the possible combinations. A particular combination of real values of input variables, the input values measured at an instant, designates one or more cubes if a variable belongs simultaneously to several ranges. The qualitiative values of the output magnitude contained in these cubes constitute the designated qualitative values of the output magnitude.

For each of these cubes, where each value belongs to only one zone, an output qualitative zone of the output magnitude must be defined. It is again observed at this stage that, owing to the possible overlapping of the ranges of the input values, a same input magnitude value may be present on several qualitative ranges.

It follows therefrom that a set of three real inputs may lead to several of the 24 cubes of the 3D space. Each of the cubes that is reached contains only one qualitative value of the output variable, but each of the cubes thus designated may contain a zone of output values that is identical to or different from the other designated zones which are in the other cubes corresponding to the three values of the input magnitudes. Even if only one of the 24 cubes is designated by the 3 input values, the value of the output magnitude contained in this cube is a qualitative value that must be converted into a quantified value. The object of the "defuzzification" rules is to determine a quantified value for the output magnitude when the exploitation of the qualitative rules leads to one or more qualitative values of the values of the output magnitude. Before speaking of the defuzzification rules, the distribution of the magnitudes in the 24 cubes of the 3D space shall be defined here below. This distribution is defined by the presence of a numeral, extending from 1 to 7, in each of the 24 cubes. A sharing of the cubes between a high dslip and a low dslip leads to two 2D spaces (slope and slippage) enabling the constitution of two matrices.

The matrix corresponding to a high dslip is uniformly filled with sevens, i,e. pressure is removed to the greatest possible extent. This matrix makes it possible to limit the speed of the rising of the slippage in the positive slope zone and in the negative slope zone. In the positive slope zone, this rule makes it possible not to pass the peak C too swiftly and, in the negative slope zone, it makes it possible not to go too far in the high values of slippage.

The second matrix corresponds to lower variations of slippage. For this matrix, the following rules apply:

If the slippage is too high (3rd line of the matrix) then, regardless of the value of the slope, it is necessary to remove a great deal of pressure (but less than when there is a start towards locking triggered by high dslip) by means of the zone 6 (pressure — — — —).

If the slippage is medium (2nd line of the matrix), then it is still necessary to remove pressure, whatever may be the slope. A little less pressure must be removed for the maximum M hence zone 5 is being approached (pressure — — —).

If the slippage is small (first line of the matrix), namely in the normal zone, then the value of the slope may come into play.

If the slope is highly negative (slope — —), then pressure must be removed but moderately, hence zone 4 (pressure — —).

If the slope is negative (slope —) then it is necessary to remove a little pressure, hence zone 3 (pressure —).

If the slope is positive (slope +), then it is necessary to add a little pressure, hence zone 2 (pressure +).

If the slope is highly positive (slope + +), then it is necessary to add much pressure, hence zone 1 (pressure + +).

The regulator must actually get stabilized between the zones 2 and 3 to keep low pressure variations and remain in the region of the maximum.

The rules of "defuzzification" will now be explained. These rules bring into play the coefficients of membership of the input variables. They also bring into play a coefficient of weight for each of the qualitative output values designated by the real values of the input magnitudes.

The rule chosen is that each designated zone of output values comes into play with a weight coefficient that is equal to the value of the smallest of the coefficients of membership of the three input magnitudes leading to this zone. This rule can be applied directly to the qualitative values of pressure 1, 2, 3 and 4 which, since they are in only one of the 24 cubes, can be designated only once. It may happen, on the contrary, that the qualitative values 5, 6, 7 which are in several cubes are designated several times. In this case, each cube will be examined to find out which coefficient of membership of each of the three magnitudes is the smallest and, of the coefficients thus selected, the greatest will be kept. It is this greatest of the smallest coefficients that will be equal to the coefficients of weight of the qualitative value. The notion of coefficient of weight shall now be specified by the use made thereof to arrive at a quantified output value from the designated qualitative values and their coefficients of weight. It is now necessary to work on the plane defined by the zone of value of the variations of output pressure and coefficients of membership in these zones. If a uniform weight per unit of area is assigned to this plane, the weight of each zone is defined as the weight of the part of the plane demarcated by the x-axis, by the curve defining the coefficient of membership, in the zone, of each value of the zone, by a straight line parallel to the x-axis and at a distance, from this straight line, that is equal to the coefficient of weight chosen for the zone as a function of the coefficients of membership of the input variables as explained further above and, as the case may be, by perpendiculars to the x-axis taken through the limit points of the zone.

The quantified output value is equal to the x-axis value of the center of gravity of all the surfaces defined here above.

SUMMARY OF THE INVENTION

In brief, the invention relates to a method to control the value of a braking torque of a wheel that is rotationally linked to a vehicle applying the wheel on a track, the forces of adherence between the wheel and the track being capable of prompting a rotation torque of the wheel that counters the braking torque, the maximum value of which is, at each instant, a function of a coefficient of slippage g of the wheel on the track, it being possible to represent the value of this maximum as a function of the coefficient of slippage by a curve of adherence itself having, at a point C, a maximum M for a value $g_0$ of the slippage coefficient, said method consisting, after a preliminary stage of initialization, in making an iterative computation, according to the principles of fuzzy logic, of an output magnitude representing an algebraic increase of a preceding value of the braking torque, the computation being done on the basis of input magnitudes that depend directly or indirectly on the value of the coefficient of slippage of the wheel on the track, in comparing the corrected value of the braking torque with a control value of this torque and, if necessary, in limiting the last increase computed so that the computed value of the torque is at most equal to a control value, finally in applying the computed torque to a braking device.

The input magnitudes are the slippage coefficient of the wheel g, derivatives of this coefficient with respect to time and derivatives of the braking torque with respect to the slippage.

The preliminary phase comprises:

the fixing, for each input magnitude, of a number of continuous qualitative ranges and of a number of continuous qualitative zones for the output magnitude, each of the ranges or zones comprising all the values extending from a minimum value to a maximum value, these two values constituting the limits of the range or zone;

the assigning of a coefficient of membership ranging from 1 to 0 to each value of each range or zone;

the assigning, to each combination of three ranges that can be constituted with a range of each of the input values, of a number identifying one of the qualitative zones of the output value;

the assigning, to each zone, of the output value of a weight which is a magnitude proportional to a surface demarcated by a segment whose length is equal to the length of the zone, by a curve representing, in a direction perpendicular to the segment, the value of the coefficient of membership in the zone of each value of the segment and, possibly, by perpendiculars to the segment that are taken to its ends;

the defining of a rule to determine a quantified output value from qualitative zones designated by each of the combinations that can be constituted with a range to which belongs each of the three input values, measured during the subsequent performance of the method, the rule stipulating that the quantified value is a function of the weight of each of the designated zones and, for each of them, a function of a coefficient of weight which is itself a function of the coefficients of membership of each real measured value in the range participating in the combination that designates the output qualitative zone.

The words "ranges" and "zones" designate the same entities, namely a continued sequence of values between two limit values. To make it easier to understand the invention, it has been chosen throughout the description to reserve the word "range" for input values and the word "zone" for output values.

In the preferred embodiment, the input magnitudes are a magnitude dslip which is the first derivative of the slippage with respect to time. This value is distributed between two ranges, a magnitude called slope which is the first derivative of the braking torque with respect to the slippage, said value being distributed among four ranges, and the coefficient of slippage which, for its part, has been divided among three ranges.

The output magnitude is the variations with respect to a previous value of the braking torque, which has been distributed among seven zones. These seven zones are numbered 7 to 1. Their middle algebraic values are values increasing from the zone 7 to the zone 1. The middle value of each zone is the mean value of the two limit values of the zone.

The invention also relates to a device to achieve the invention, namely a device for the control of the value of a braking torque of a wheel rotationally linked to a vehicle, the braking torque countering a rotation torque, the maximum value of which, at each instant, is a function of a coefficient of slippage of the wheel on a track, it being possible to represent the value of this maximum as a function of the coefficient of slippage by a curve of adherence which itself has, at a point C, a maximum M for a value g of the slippage coefficient, the braking device comprising a brake actuator, a braking element, a sensor of the rotational speed of the wheel, a sensor of the braking torque, wherein said device further comprises a sensor of the speed of the vehicle, control and regulation means receiving firstly the measured values coming from the braking torque, wheel rotational speed and vehicle speed sensors and secondly a control value coming from a control device, the control means computing an algebraic variation of the braking torque as a function of the sensed values and the control value, limiting this variation so that the torque remains at most equal to the control value, the variation being applied by means of the actuator to the braking device.

BRIEF DESCRIPTION OF THE DRAWINGS

An exemplary embodiment and variants shall now be described with reference to the appended drawings, of which.

MORE DETAILED DESCRIPTION

Figure 1B:
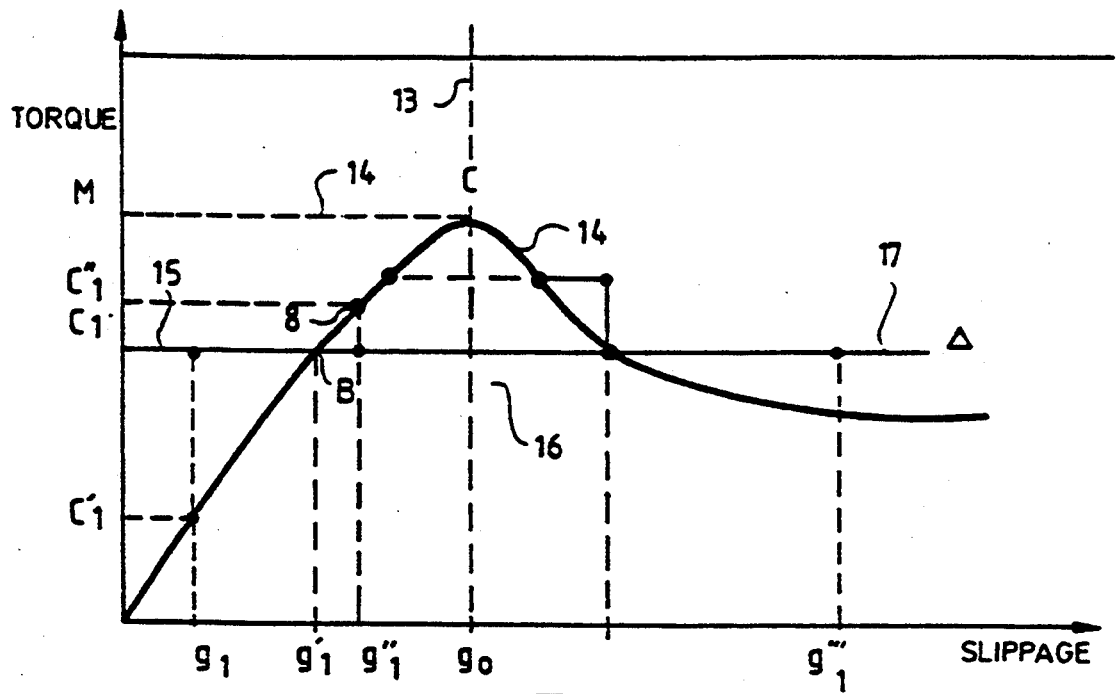
FIGS. 1a and 1b are drawings designed to explain the principle of the operation of the invention.
Figure 1A:
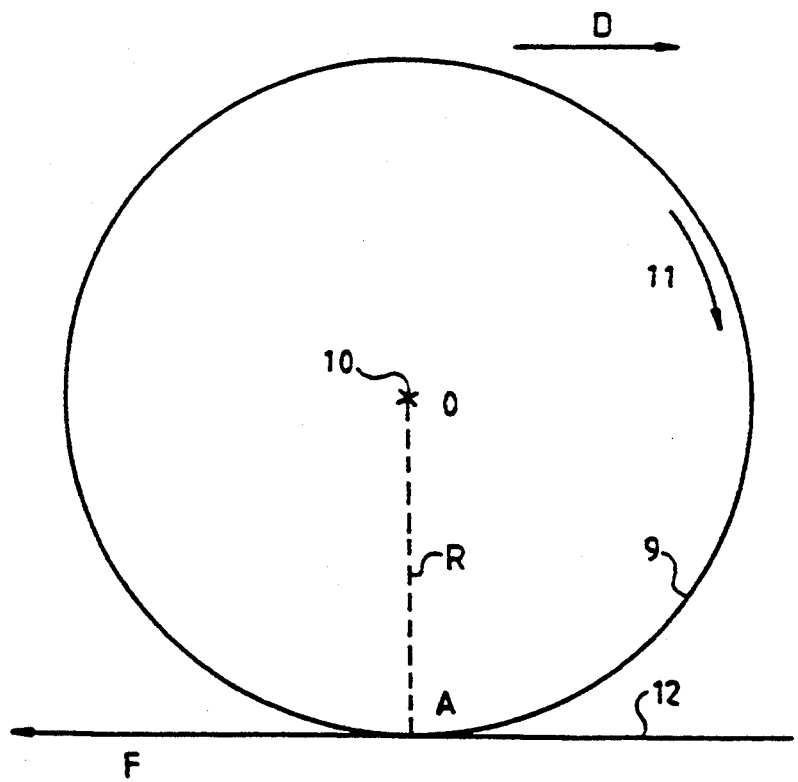

FIGS. 1a and 1b have been described further above.

An exemplary embodiment of the method according to the invention shall now be described. The three input magnitudes in this example are the coefficient of slippage, the slope which is the derivative of the coefficient of slippage with respect to the braking torque and the variable dslip derived from the coefficient of slippage with respect to time.

The qualitative ranges and the coefficient of membership in these ranges are explained here below and shown in FIGS. 2 to 5 respectively.

Figure 2A:
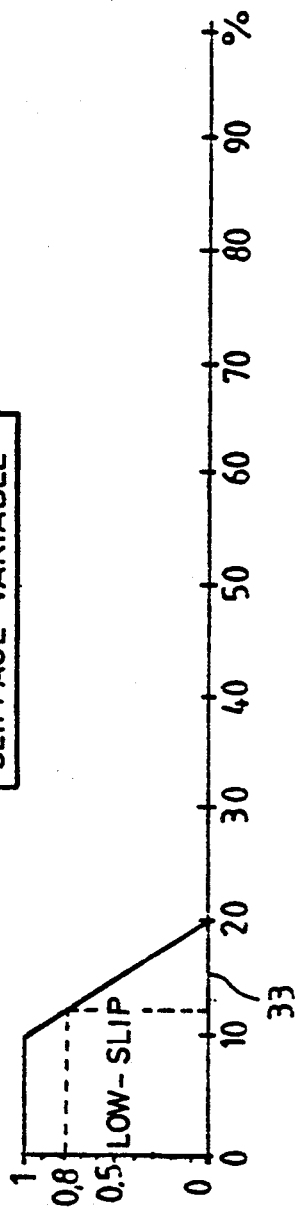
FIGS. 2 to 5 show the ranges and zones of the input and output magnitudes.
Figure 2B:
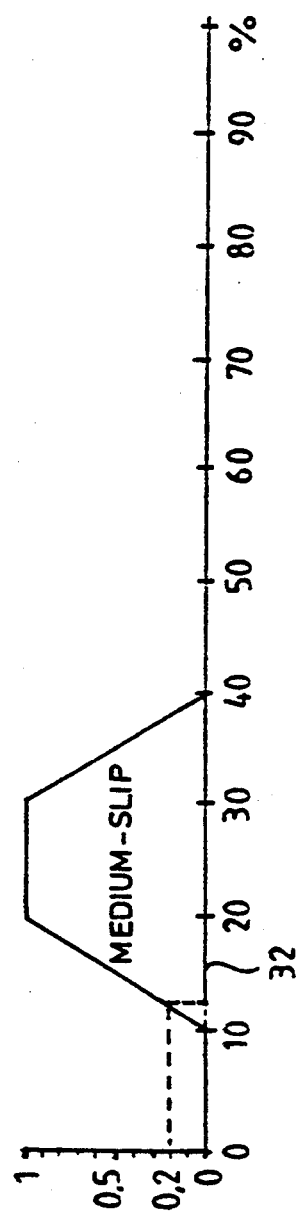
Figure 2C:
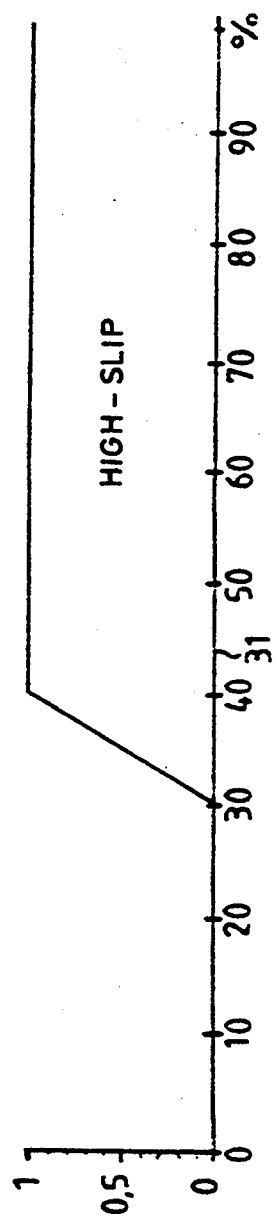
Figure 3A:
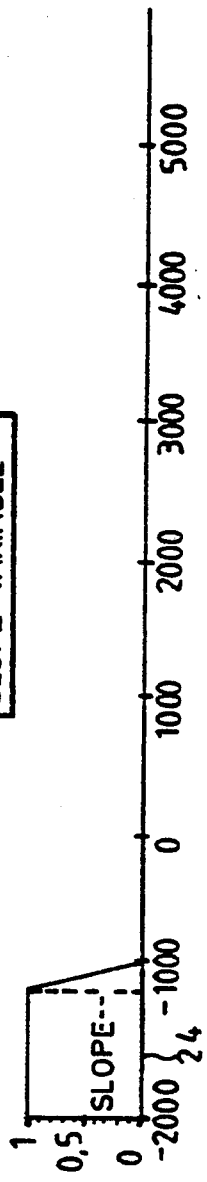
Figure 3B:
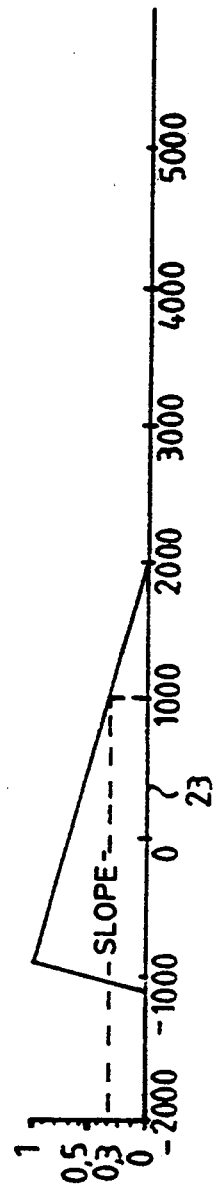
Figure 3C:
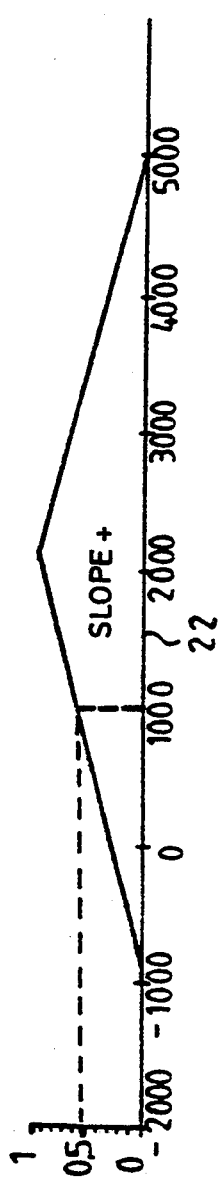
Figure 3D:
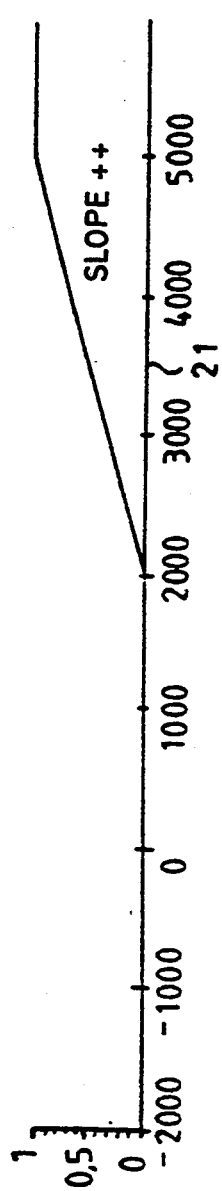
Figure 4A:
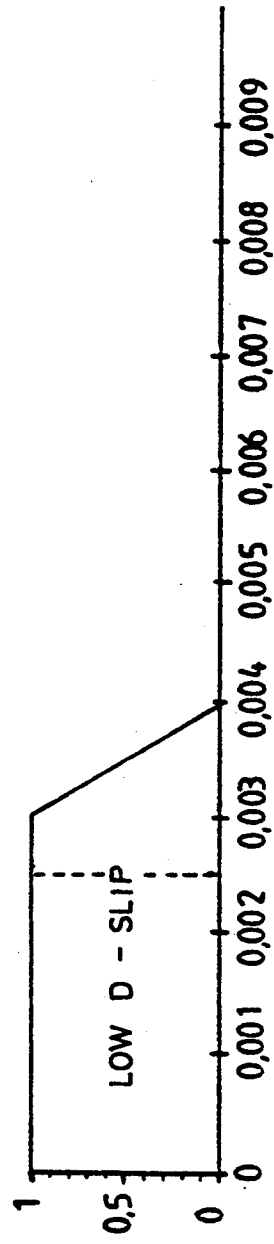
Figure 4B:
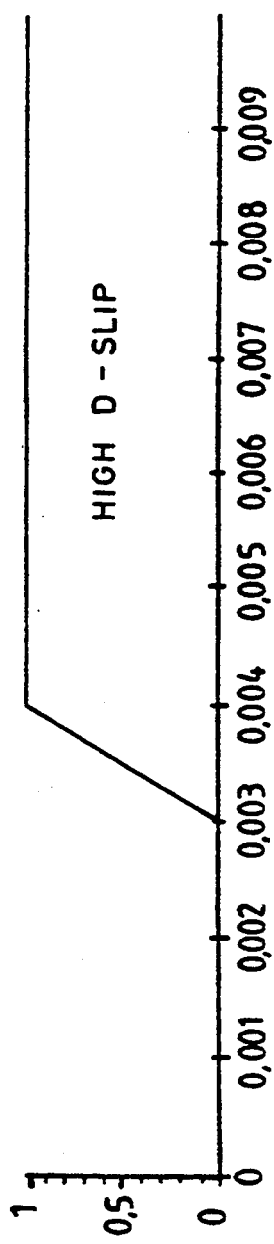
Figure 5A:
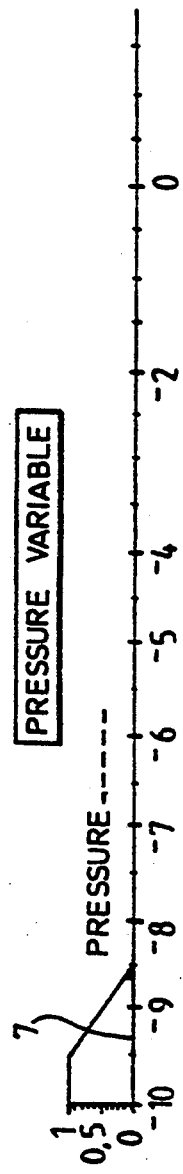
Figure 5B:
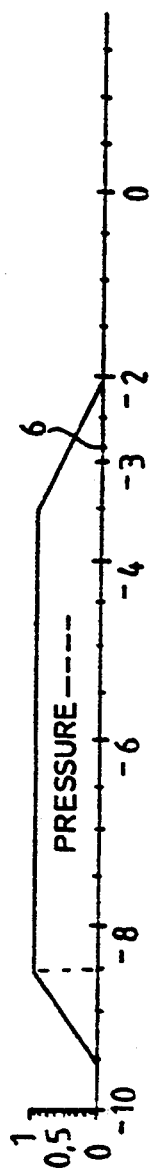
Figure 5C:
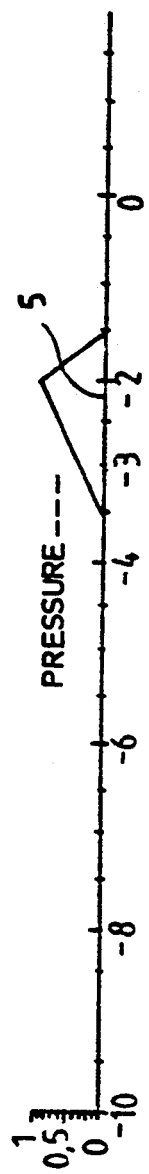
Figure 5D:
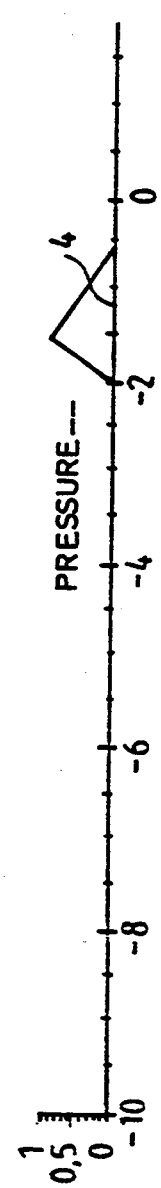
Figure 5E:
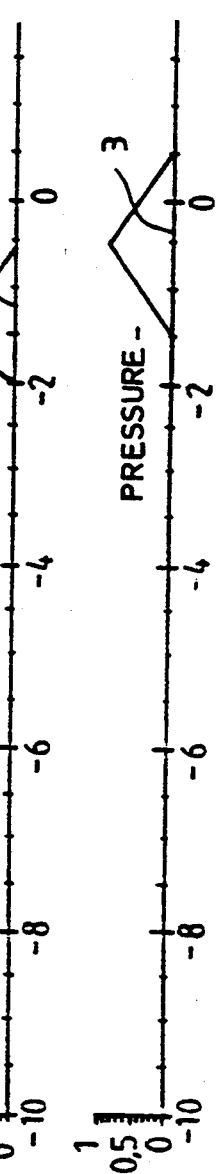
Figure 5F:
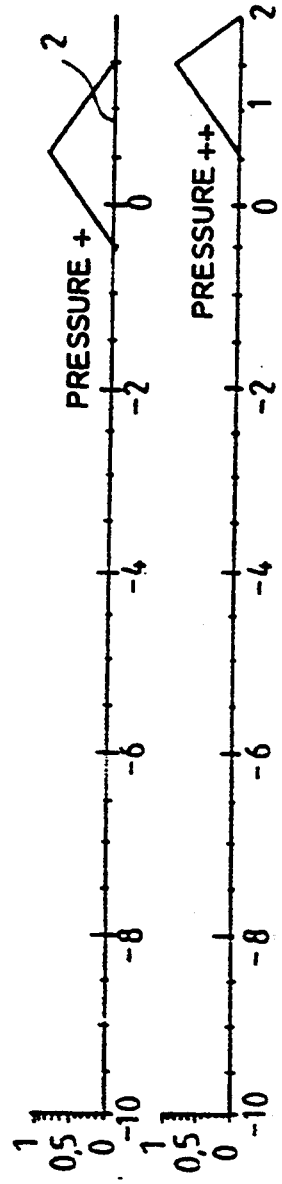
Figure 5G:
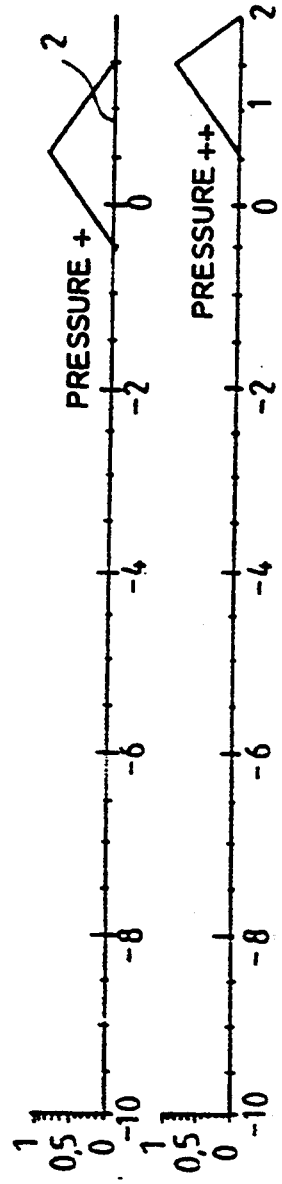

The slippage magnitude has been divided into three ranges shown in FIGS. 2a to 2c.

The curve representing the value of the coefficient of membership of each value of the range is also shown in these Figures. The three zones bear reference numbers 33 to 31.

The first range (small-slip) has a coefficient of membership at the value 1 for a slippage rate ranging from 0 to 10%. This coefficient then decreases linearly towards the value 0 which is attained for $g=20\%$.

In principle, this zone covers all the normal adherence values, namely those for which the optimum slippage is within the zone. If rather special surfaces are encountered, where the optimum g is greater than 10%, then there is a risk that the regulator will carry out its regulation on a wrong value of slippage or even become unstable.

The other two ranges (medium-slip and high-slip) give rise to rules that reduce the pressure in the brakes in order to return to the first range. The limit values to be assigned to these ranges are not very important. They do not greatly influence the efficiency of the regulation (for a simpler regulator, it is even possible to limit the operation to a single range that encompasses both of them).

The medium-slip range extends between the limit values 10% and 40%. The coefficient of membership increases linearly from 0 to 1 between 10% and 20%, remains at 1 between 20% and 30% and then decreases linearly from 1 to 0 between 30% and 40%.

The high-slip range extends from 30% to 100%. The membership coefficient increases linearly from 0 to 1 between 30% and 40% and then remains at 1.

With regard to the slope value, four ranges have been created. The values of these ranges and the curves representing the coefficients of membership of the values of these ranges are shown in FIGS. 3a to 3d. A first range called a slope − − (s− −) referenced 24 is located entirely in the negative slopes between −2000 and −900.

The coefficient of membership is at 1 between −2000 and −1000 and decreases linearly from 1 to 0 between −1000 and −900.

A second slope, called "slope −" (s−) referenced 23, goes from −1100 to +2000. The coefficient of membership increases from 0 to 1 between −1100 and −900 and decreases linearly towards 0 from −900 to 2000.

A third slope, referenced 22, called "slope +" (s+) goes from 900 to +5000, the coefficient of membership in the range increasing from 0 to 1 between −900 and +2000 and then decreasing to 0 between 2000 and 5000.

Finally, a fourth range, called "slope ++", (p++) referenced 21 comprises the values greater than 2000. The coefficient of membership in this range increases from 0 to 1 between 2000 and 5000 and then remains at the value 1.

It is observed that when it is desired to regulate the braking torque in such a way as to remain in the neighborhood of the point C of the curve 8, it is necessary to work in the neighborhood of the zero slopes. Measurements of real curves have shown that when g is smaller than the optimum slippage value $g_0$, the slope varies from about 40000 to 0 and then varies from 0 to −3000 when g is greater than $g_0$. It follows therefrom that a value of s=1000 for example is at a far greater distance from $g_0$ than a slope of +1000. This is why the slope + and slope − ranges, which are the two ranges to which it is sought to bring the operating point so as to remain in the neighborhood of C, are not symmetrical with respect to 0. In particular, the point of intersection of these two ranges, i.e. the value for which the coefficient of membership of each of the ranges has the value 0.5, is not at s=0 as would be the case if the ranges were to be symmetrical but at a value for which p=500.

This amounts to entering a set value of slope equal to +500 instead of zero. This does not greatly influence the regulation. On the contrary, it forces the regulator to remain slightly more towards the stable zone (s>0).

The other two zones (s++ and s−−) are the complements of the first two zones for the steeper slopes (cf. FIG. 3).

A regulator with only the two input variables defined here above could suffice by itself. By contrast, it would be far too slow and, above all, given the fact that, as soon as the wheel reaches the range of the negative slope values, it very quickly starts moving towards a state of getting locked, it is necessary to have the possibility of anticipating with respect to permanent regulation, during the transient phenomena when starting or during changes of adherence. This has been done by adding an input variable, the derivative of the slippage with respect to time (dslip) which indicates that the slippage is rising at an abnormally high rate. In this case, it is possible to anticipate in order to reduce the pressure in the brakes. This leads to the creation of two ranges of dslip represented with their membership curves shown in FIGS. 4a to 4b.

The first range (low dslip) is the one where the variation of slippage is considered to be normal. It is in this range that the regulator operates in its permanent state. It goes between the limit values 0 and 0.004. The coefficient of membership in this range is 1 between the values of 0 and 0.003 and decreases to 0 from 0.003 to 0.004.

The second range (high dslip) is the one that triggers a sudden reduction of the pressure in the brakes. It comprises values greater than 0.003. The coefficient of membership goes from 0 to 1 between 0.003 and 0.004 and then remains at 1. The intersection with low dslip takes place for the value 0.0035. The adjustment of the limit values and of the point of intersection has been done by simulation. The point of intersection between the two ranges should be such that the reduction in pressure takes place at the right time, when the pressure is at its maximum during the transient phase at the beginning of the braking. This adjustment depends on the adjusting of the output magnitude and it is therefore necessary to carry out the operation iteratively.

The output magnitude is an algebraic increase in pressure that must be added to the current pressure in the brakes to regulate the system. It is therefore necessary, if the system is to be stable, that it should give a zero output when the point of operation is at the peak C of the curve 8. To this end, it is necessary to create two pressure zones, symmetrical with respect to zero, that will get triggered on the low slope zones (slope + and slope −). This makes it possible to have a center of gravity located at zero. The other zones enable a return to the stable state (s+ and s−) of the regulator. The greater the distance of a zone from 0, the greater is its influence and the greater is the extent to which it will generate a major variation in pressure.

The zones of pressure values have been shown along with their coefficients of membership (FIGS. 5a to 5g). The x-axis values are pressures expressed in terms of hectokilopascals (100,000 pascals). These values correspond to braking torque values as explained here above. Seven zones have been created.

The first zone, referenced 7, corresponds to a variation in pressure going from −10 to −8.5, called pressure 5−. The coefficient of membership in this zone has the value 1 from −10 to −9.5 and then decreases linearly up to zero from −9.5 to 8.5.

The second zone, referenced 6 and called pressure 4−, goes from −9.5 to 2. The coefficient of membership increases from 0 to 1 between −9.5 and −8.5, remains at 1 from −8.5 to −3.5 and decreases to zero between −3.5 and −2.

The third zone referenced 5 and called pressure 3 goes from −3.5 to −1.5, the coefficient of membership increasing from 0 to 1 between −3.5 and −2 and then again decreasing to 0 between −2 and −1.5.

The fourth zone referenced 4 and called pressure 2− goes from −2 to −0.5, the coefficient of membership increasing from 0 to 1 between −2 and −1.5 and then decreasing from 1 to 0 between −1.5 and −0.5.

The fifth zone referenced 3 and called pressure − goes from −1.5 to +0.5, the coefficient of membership in this zone increasing from 0 to 1 between −1.5 and −0.5 and then decreasing from 1 to 0 between −0.5 and +0.5.

The sixth zone referenced 2 and called pressure + goes from −0.5 to +1.5, the coefficient of membership increasing from 0 to 1 between −0.5 and +0.5 and then decreasing from 1 to 0 between +0.5 and +1.5. It is seen that the zones 3 and 2 are symmetrical. The coefficients of membership in this zones have the value 0.5 for a zero increase in pressure. It is to these two zones that it is sought to bring the operating point.

The values carried in these two zones are low enough not to create major pressure variations that would risk destabilizing the braking. The pressure variations of the other zones are aimed at returning the point of operation speedily to these two working zones. The lower limit of the zone 7 has been pushed back until the size and hence the position of the center of gravity and the weight of the zone are sufficient to limit the pressure during the transient phase at the start of the braking.

The seventh zone referenced 1 and called pressure 2+ goes from 0.5 to 2, the coefficient of membership going from 0 to 1 between 0.5 and 1.5 and decreasing from 1 to 0 between 1.5 and 2.

It is observed that the membership curves, both for the inputs and the output, are constituted by two or three straight line segments of which one, in this latter case, is at the distance 1 from the x-axis. This method has the advantage of great simplicity for the definition of the curves. Four points are enough to define a curve, the two limit points of the zone or range and the two limit points corresponding to the values having the coefficient of membership 1, it being possible for these latter two points to be one and the same. It is probable that better results could be obtained with curves of variation of the membership coefficient between 0 and 1 and 1 and 0 which tangentially meet the x-axis or the straight line having a y-axis value of 1.

After having defined the input and output variables and the membership curves, it is necessary to define the qualitative rules that must be followed by the regulator. They have the following form:
if qualitative input 1=a
if qualitative input 2=b
if qualitative input 3=c
then output=d Each output d is one of the qualitative zones of the output magnitude.

The "defuzzification" rule which enables passage from a qualitative value to a quantitative value has been defined here above. It shall be illustrated hereinafter by means of an example.

For this example, reference shall be made to FIGS. 2 to 5 on which a real value has been fixed for each variable.

In FIG. 2, the coefficient of slippage has been fixed at the value of 12%. This value belongs to the small-slip range with the membership coefficient 0.8 and to the high-slip range with the membership coefficient 0.2. The slope (FIG. 3) has been fixed at 1000. This value belongs to the slope − range or the range 23 with the membership coefficient 0.3 and to the slope + range 22 with the membership coefficient 0.5. The variation of slippage has been fixed at 0.0025, namely the low dslip range with a membership coefficient at 1.

It may be recalled that the application of the rules leads to the following output qualitative zones:
1) For a high dslip, all the outputs are at 7 irrespectively of the slope or the slippage;
2) for a low dslip
all the outputs are at 6 irrespectively of the slope if the slippage is high (range 31);
all the outputs are at 5 irrespectively of the slope if the slippage is medium (zone 32);
if the slippage is small (range 33), the output is at 4 if the slope is in the zone 24, 2 in the zone 22 and 1 in the zone 21.

Figures 6, 7:
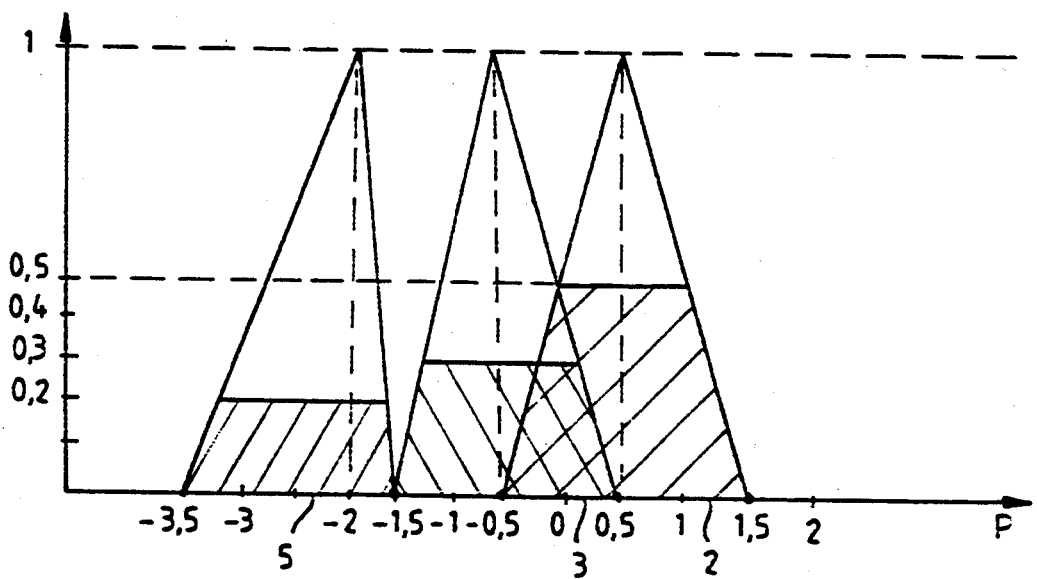
FIGS. 6 and 7 are designed for the illustration, in one example, of the mode of computing a quantified output value from the real values of the input variables.

For the example considered, the point of operation is in the low dslip range corresponding to the matrix shown in FIG. 6. The slippage belongs to the ranges 33, 32 and the slope to the ranges 22, 23. The four compartments located at the intersection of the columns 22, 23 and the lines 33, 32 are designated: these correspond to the output values 2, 3 and the value 5 which is designated twice.

For the slippage of 0.8 and 0.2 and for the slope of 0.5 and 0.3, the membership coefficients are values that are carried into the corresponding compartments of FIG. 6.

FIG. 7 shows the output zones 2, 3, 5 and their membership curves. In this FIG., the weight of each zone is defined by the weight of the plane surface (assumed to be uniformly weighty) between the segment defining the zone and the curve of membership in this zone. The application of the "defuzzification" rules will lead to the definition, for these zones, of a weight coefficient.

For the zone 5, which has been designated twice, the greatest of the smallest membership coefficients is 0.2. For this example, the weight chosen for the zone is the weight of the surface limited by the segment defining the zone, the membership curve and the parallel to the x-axis having the y-axis value 0.2. This surface is hatched (FIG. 7). Similarly for this example, the weight chosen for the FIG. 3 is the weight of the surface limited by the segment defining the zone, the membership curve and the parallel to x-axis having a y-axis value of 0.3 for 0.3 is the greatest of the smallest membership coefficients of the input variables (cf. explanations here above). The weight of the zone 2 is defined in the same way, the smallest of the membership coefficients being 0.5.

The quantified output value is represented by the x-axis value of the center of gravity of the three surfaces chosen for the zones 5, 3 and 3. These zones are hatched (FIG. 7).

It will be noted that this "defuzzification" rule is not the only one possible. In particular, it would be possible to assign each zone a different weight per unit of surface area so as to give, for example, greater weight to the limit zones.

An example and variants of devices intended to obtain the invention shall now be described with reference to FIGS. 8 and 9.

Figure 8:
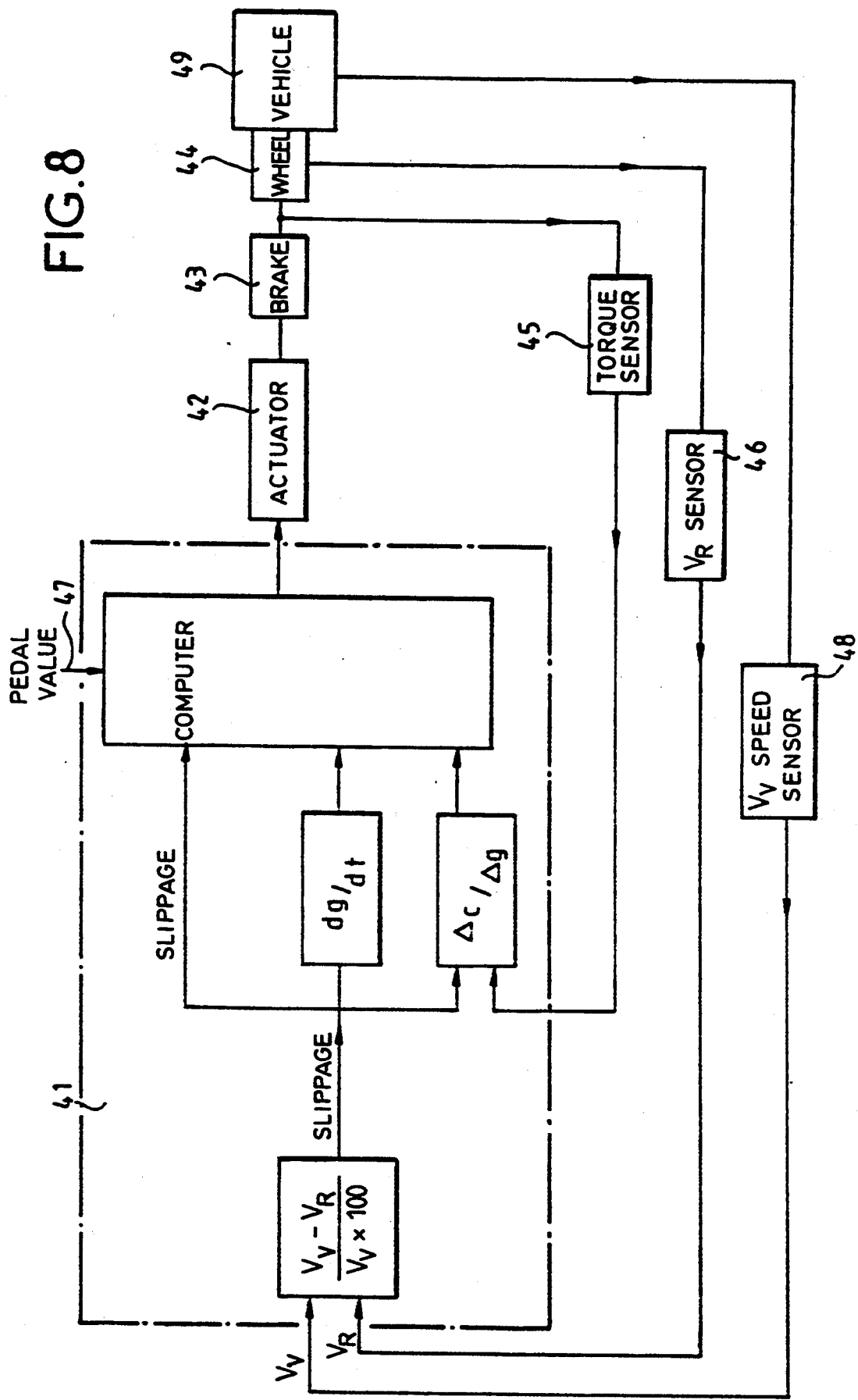
FIG. 8 shows a device according to the invention.

FIG. 8 represents a device working according to the invention. A vehicle 49 comprising at least one wheel 44 linked to the vehicle by a shaft not shown comprises a braking torque sensor (not shown). This sensor measures a pressure applied in a known way to the blocks of a braking device 43 of the wheel.

It also has a sensor 46 of the rotational speed of the wheel ($V_R$). In a known way, this sensor 46 may be constituted by a toothed wheel fixedly joined to the wheel of the vehicle. The speed of the wheel is determined by computing the time interval that elapses between the passage of two consecutive teeth. The number of teeth of the wheel of the Sensor directly influences the precision of the value given by sensor. Indeed, the speed value is updated only at each time that a tooth passes before the detector of the sensor. The precision will therefore depend on the number of teeth but also on the speed of the wheel. The lower the speed, the lower is the precision. In the exemplary embodiment, at each time that a tooth passes before the detector, the value of the speed given by the sensor is taken. It being known that the speed can only get reduced during the braking, an estimation is made of the time interval at the end of which the next tooth must go before the detector if the wheel continues at the same speed. If no tooth has passed after this interval, the value of the sensor is replaced by a maximum speed that the wheel may have.

In the exemplary embodiment, the number of teeth of the sensor 46 has been fixed after tests at fifty.

The vehicle finally has a sensor 48 of the speed of the vehicle $V_V$. This sensor may be either a radar making use of the Doppler effect or an accelerometer and an integrator, the latter receiving the wheel speed $V_R$ which is assumed to be equal to the speed of the vehicle when the brake is not actuated.

The output values of the three sensors 45, 46, 48 as well as a control value 47 are introduced into control and regulation means 41. Using data elements received from the sensors 46 and 48, the means 41 compute the slippage coefficient g. On the basis of this coefficient, it is possible to compute the values of the variables dslip and slope. These values, as well as the control value 47, are then used for the computation, according to the method indicated here above, of the value of variation of the braking torque, this variation being applied to the actuator 42.

Figure 9:
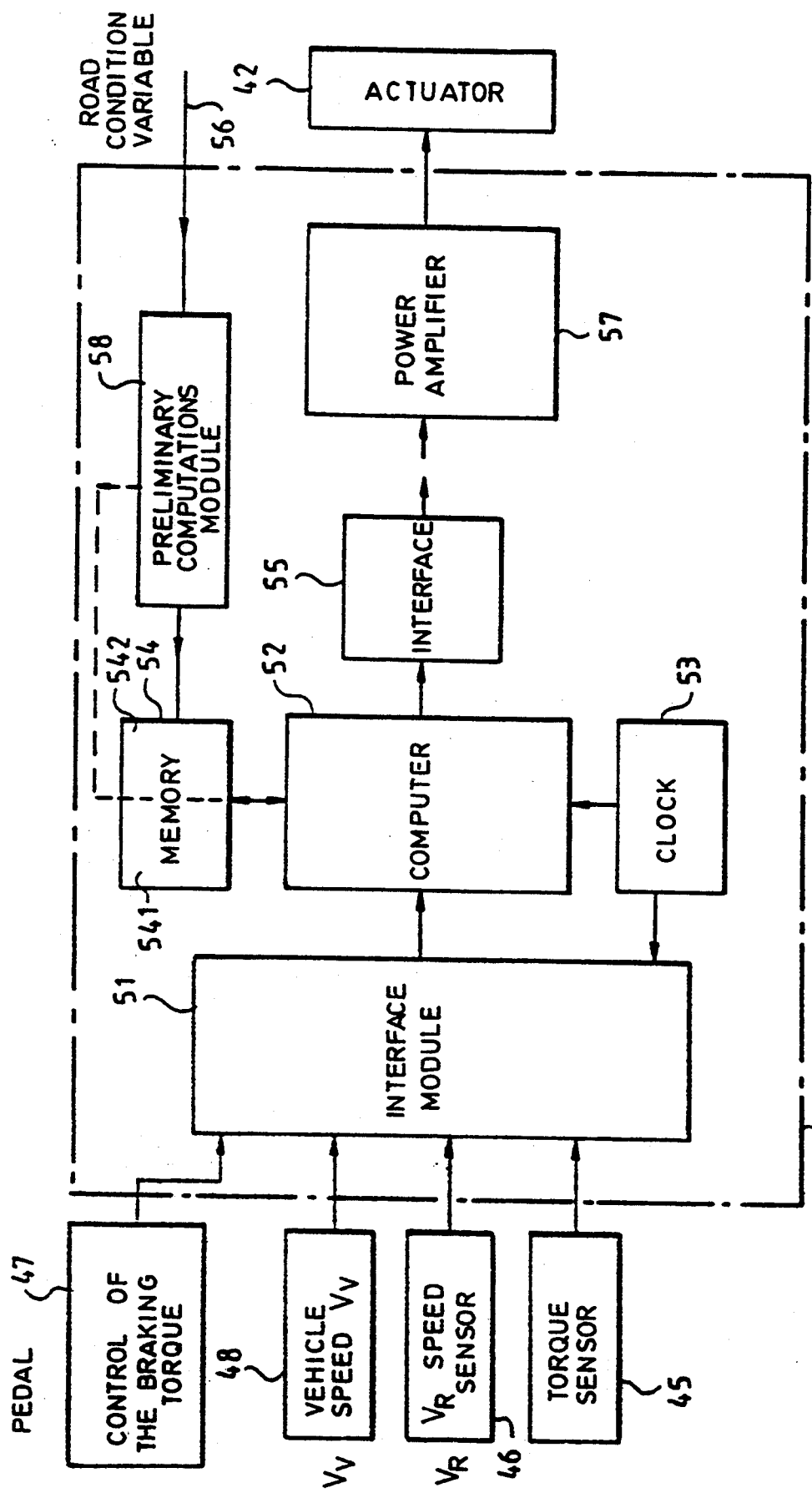
FIG. 9 shows a detailed view of the device according to FIG. 8 as well as a variant in which the preliminary phase comprises the introduction of parameters.

FIG. 9 gives a detailed view of a possible embodiment of the control and regulation means 41. An interface module 51 converts the information elements transmitted by the sensor 46 of angular speed of the wheel, the sensor 45 of braking torque exerted on the wheel, and the sensor 48 of speed of the vehicle, as well as the braking command 47 transmitted by a driver or pilot, into digitized values that can be taken into account by a digital computer 52. This computer 52 may contain, for example, at least one standard arithmetical computation unit associated with a floating operator and with working memory. This computer may also be a computer dedicated to fuzzy logic computations. To digitize the information elements transmitted, the interface module 51 uses clock signals 53 and analog-digital converters if the signals are of the analog type or counters if they are of the periodic or frequential type. The signal coming from the sensor 46 of the angular speed of the wheel may be processed, for example, according to two methods: by measurements of frequencies at the high speeds and by the determination of a maximum speed as indicated further above at the low speeds. The program of the computer as well as the definition of the ranges and zones as well as the coordinates of the points defining the membership curves ere stored in a memory 54.

The control of the braking torque 47 encoded by the interface module 51 informs the computer 52 that the vehicle is in a braking phase. As soon as this command appears, the circuits of the computer get re-initialized and begin the computations. An interface 55 coupled to the output of the computer 52 gives a corrective signal leading to a torque value at most equal to the braking of the braking torque 47. This corrective signal is transmitted by the computer 52 to the interface 55. The control signal coming from the interface 55 is applied to a power amplifier 57, the output signal of which directly controls the brake actuator 42. The computation means of the device shown in FIGS. 8 and 9, namely the computer 52, the memory 54 and the clock 53, may for example be shared in a known way among several devices for the braking of the wheels of a same vehicle.

In one alternative embodiment also shown in FIG. 9, it is possible to introduce, for example by hand, a variable 56 representing a range of slippage coefficients which is a range selected by the pilot or driver as a function of the meteorological conditions. The introduction of this variable then enables, by means of a preliminary computation module 58, either the introduction, into the memory, of the points defining the ranges and zones computed as a function of the value of the variable or the selection of memory addresses where these pre-computed values are contained. The latter approach will be preferred when the variable 56 is defined by three ranges at most, for example dry road, wet road or snowy road. In FIG. 9, this possibility has been represented by means of dashes. The output of the module 58 addresses parts 541, 542 of the memory.

What is claimed is:

1. A method to control the value of a braking torque of a wheel that is rotationally linked to a vehicle applying the wheel to the road on a track, the forces of adherence between the wheel and the track being capable of prompting a rotation torque of the wheel that counters the braking torque, the maximum value of which is, at each instant, a function of a coefficient of slippage (g) of the wheel on the track, it being possible to represent the value of this maximum as a function of the coefficient of slippage by a curve of adherence itself having, at a point (c), a maximum (M) for a value ($g_0$) of the slippage coefficient, the method comprising:

iterative computation, according to the principles of fuzzy logic, of an output magnitude representing an algebraic increase of a preceding value of the braking torque, this increase being added to the preceding value of the braking torque to determine a corrected value of the braking torque, a first value of the torque being constituted by a control value, the computation being done on the basis of three input magnitudes comprising the value of the coefficient of slippage of the wheel on the track, a slope magnitude (s) representing the derivative of the braking torque with respect to the slippage, a magnitude (dgliss) being the first derivative of the slippage with respect to time;

comparison of the corrected value of the braking torque with the control value of this torque;

limiting, if necessary, of the last increase computed so that a computed value of the torque resulting from the addition of the computed increase, possibly limited, is at most equal to the control value;

application of the computed value to a braking device, said operations of computation, comparison, limiting if necessary and application taking place at the end of a phase preliminary to the use of the method, comprising:

fixing, for each input magnitude, of a number of continuous qualitative ranges and of a number of continuous qualitative zones for the output magnitude, each of the ranges or zones comprising all the values extending from a minimum value to a maximum value, these two values constituting the limits of the range or zone;

assigning of a coefficient of membership ranging from 1 to 0 to each value of each range or zone;

assigning, to each combination of three ranges that can be constituted with a range of each of the input values, of a number identifying one of the qualitative zones of the output value assigning, to each zone, of the output value of a weight which is a magnitude proportional to a surface demarcated by a segment whose length is equal to the length of the zone, by a curve representing, in a direction perpendicular to the segment, the value of the coefficient of membership in the zone of each value of the segment and, possibly, by perpendiculars to the segment that are taken to its ends; and defining of a rule to determine a quantified output value from qualitative zones designated by each of the combinations that can be constituted with a range to which there belongs each of the three input values, measured during the subsequent performance of the method, the rule stipulating that the quantified value is a function of the weight of each of the designated zones and, for each of them, a function of a coefficient of weight which is itself a function of the coefficients of membership of each real measured value in the range participating in the combination that designates the output qualitative zone.

2. A method according to claim 1, wherein the input magnitude (dslip) is divided into two ranges, one low (dgliss) range and one high (dgliss) range.

3. A method according to claim 1, wherein the slope magnitude is divided into four qualitative ranges numbered 24 to 21, the middle algebraic values of which increase from the range 24 to the range 21.

4. A method according to claim 1, wherein the slippage magnitude is divided into three qualitative ranges numbered 33 to 31, the middle values of which increase from the range 33 to the range 31.

5. A method according to claim 1, wherein the output magnitude is divided into 7 zones numbered 7 to 1, the middle algebraic values of which increase from the zone 7 to the zone 1.

6. A method according to claim 1, wherein the zones of division of the output magnitude comprise two zones including the value 0.

7. A method according to claim 1, wherein the value of the coefficient of weight assigned to a zone designated by a combination of qualitative ranges to which the real values of the input magnitudes belong is equal to the smallest of the coefficients of membership of each real value in its range when the zone is designated only once, and to the greatest of these smallest coefficients in each of the combinations designating the same zone when this zone is designated several times.

8. A method according to claim 7, wherein the quantified value of the output magnitude is equal to the x-axis value of the barycenter of the centers of gravity of a part of a surface defining the weight of the zone, this part of a surface being a surface ranging from the x-axis to a parallel taken to this axis at a distance equal to the coefficient of weight assigned to the designated zone, each of the zones occupying its position on the x-axis as a function of its limit values.

9. A method according to claim 1, wherein the quantified value of the output magnitude is equal to the x-axis value of the barycenter of the centers of gravity of a part of a surface defining the weight of the zone, this part of a surface being a surface ranging from the x-axis to a parallel taken to this axis at a distance equal to the coefficient of weight assigned to the designated zone, each of the zones occupying its position on the x-axis as a function of its limit values.

10. A method according to claim 1, wherein the preliminary phase further comprises the introduction of at least one parameter qualifying the adherence, the number of ranges of each input magnitude and of zones of the output parameters as well as the limit values of the ranges and of the membership coefficients being functions of these parameters.

11. A device according to claim 10, wherein the memory comprises at least two parts, the selection means making it possible, as a function of the value of the external command, to connect only one of the parts of the memory to the computer.

12. A device for the control of the value of a braking torque of a wheel rotationally linked to a vehicle, the braking torque countering a rotation torque, the maximum value of which, at each instant, is a function of a coefficient of slippage of the wheel on a track, it being possible to represent the value of this maximum as a function of the coefficient of slippage by a curve of adherence which itself has, at a point (c), a maximum (M) for a value ($g_0$) of the slippage coefficient, the braking device comprising a brake actuator, a braking element, a sensor of the rotational speed of the wheel, a sensor of the braking torque, a sensor of the speed of the vehicle, control and regulation means receiving firstly the measured values coming from the sensors of braking torque, wheel rotational speed and vehicle speed and secondly a control value coming from a control device, the control means computing an algebraic variation of the braking torque iteratively as a function of the sensed values and the control value, limiting this variation so that the torque remains at most equal to the control value, the variation being applied by means of the actuator to the braking device, the control mans comprising a computer, a clock sequencing the computer, a memory coupled to the computer storing notably at least one set of values used for the purposes of iterative computation, wherein the memory is coupled to a preliminary computing module receiving parameter values through a command and loading or selecting, in the memory, the set of values needed for the iterative computation as a function of the values of these parameters and of a program that can be used by the preliminary computation module and is executed before the start of the iterative computation.

13. A device according to claim 12, wherein the control means further comprise at least one interface module for the digital coding of the value coming from the control device and the indications coming from the sensors, the computer being connected to the output of the module of an interface, an output interface being coupled to the output of the computer, a power amplifier coupled to the output of the output interface, the output of the power amplifier being connected to the brake actuator.

14. A device according to claim 13, in which the computer is a dedicated fuzzy logic microprocessor.

15. A device according to claim 12, wherein the wheel speed sensor is a toothed sensor comprising about fifty teeth.

16. A vehicle comprising a device according to claim 12.

* * * * *